(12) United States Patent
Wilder et al.

(10) Patent No.: US 8,332,271 B1
(45) Date of Patent: Dec. 11, 2012

(54) WEB INFLUENCED IN-STORE TRANSACTIONS

(75) Inventors: Corrine Wilder, West Palm Beach, FL (US); Rachel Gregg, St. Louis Park, MN (US); James Nelson, Bloomington, MN (US); Wendy Yungner, Maple Grove, MN (US); Andrew M. Pole, Plymouth, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 13/098,384

(22) Filed: Apr. 29, 2011

(51) Int. Cl.
*G06Q 20/00* (2006.01)

(52) U.S. Cl. ........... 705/16; 705/26.1; 705/7.29; 725/14

(58) Field of Classification Search .................. None
See application file for complete search history.

(56) References Cited

U.S. PATENT DOCUMENTS

| | | | |
|---|---|---|---|
| 5,515,270 A | 5/1996 | Weinblatt | |
| 5,909,023 A | 6/1999 | Ono et al. | |
| 6,055,573 A | 4/2000 | Gardenswartz et al. | |
| 6,185,541 B1 | 2/2001 | Scroggie et al. | |
| 7,933,800 B2 | 4/2011 | Main et al. | |
| 8,032,410 B2 | 10/2011 | Main et al. | |
| 8,117,087 B2 * | 2/2012 | Michaelis et al. | 705/26.9 |
| 2002/0046105 A1 | 4/2002 | Gardenswartz et al. | |
| 2002/0123957 A1 | 9/2002 | Notarius et al. | |
| 2002/0138348 A1 | 9/2002 | Narayan et al. | |
| 2004/0024632 A1 * | 2/2004 | Perry | 705/10 |
| 2005/0197946 A1 | 9/2005 | Williams et al. | |
| 2006/0047563 A1 | 3/2006 | Wardell | |
| 2006/0235751 A1 | 10/2006 | Kavanagh et al. | |
| 2007/0233565 A1 | 10/2007 | Herzog et al. | |
| 2007/0260521 A1 | 11/2007 | Van Der Riet | |
| 2008/0004884 A1 | 1/2008 | Flake et al. | |

(Continued)

FOREIGN PATENT DOCUMENTS

| | | |
|---|---|---|
| WO | WO0046720 | 8/2000 |
| WO | WO0062231 | 10/2000 |

(Continued)

OTHER PUBLICATIONS

Cheng et al., A Tri-Component Attitude Model in Click-and-Brick Transaction Cycle, Proceedings of Business and Information, vol. 3, Issue 1, Jul. 12-14, 2006, 11 pages.

(Continued)

*Primary Examiner* — Luna Champagne
(74) *Attorney, Agent, or Firm* — Theodore M. Magee; Westman, Champlin & Kelly, P.A.

(57) ABSTRACT

In selected embodiments a repository system correlates user browsing behavior with in-store transactions involving a number of products or product categories. For example, an online portal may receive online transactional data and in-store transactional data and associate particular user identities with such data. The user identities may be correlated by matching online transactional data with in-store transactional data. This correlation identifies a user known to frequent both online and in-store venues of the same retailer. The online portal may maintain browser repository records based on an association of online and in-store identities. In some implementations, the portal measures in-store transactions of a user known to frequent both online and in-store venues. The measurements may be performed for a predetermined time period. Such measurements may be used to extrapolate web influenced in-store transactional data from at least one browser repository record to estimate a transaction for an unknown user.

14 Claims, 6 Drawing Sheets

U.S. PATENT DOCUMENTS

| | | |
|---|---|---|
| 2008/0162269 A1 | 7/2008 | Gilbert |
| 2009/0216579 A1 | 8/2009 | Zen et al. |
| 2009/0300675 A1 | 12/2009 | Shkedi |
| 2012/0022936 A1 | 1/2012 | Main et al. |

FOREIGN PATENT DOCUMENTS

| | | |
|---|---|---|
| WO | WO02095535 | 11/2002 |
| WO | WO03098493 | 11/2003 |

OTHER PUBLICATIONS

Erik Brynjolfsson et al, Battle of the Retail Channels: How Product Selection and Geography Drive Cross-channel Competition, Jun. 2009, 38 pages.

Faulstich, Rainer, Internet Portals for Electronic Commerce, Oct. 13, 2000, 99 pages.

* cited by examiner

WEB INFLUENCED IN-STORE TRANSACTIONS

BACKGROUND

Although consumers have traditionally purchased products and services in brick-and-mortar retail stores, an increasing number of users opt to purchase from the same retail enterprises through their respective online portals. Online retail environments provide convenient access for purchasing goods and services to a number of potential consumers. This convenient access also provides a mechanism for advertisers to target consumers.

In general, advertisers expend substantial resources to draw in consumers to both in-store and online venues. Advertisements are presented to website visitors in a number of different forms and a variety of manners. Certain advertisements are presented as banners while others are presented to visitors via emails, text messages and other media.

Third parties sometimes purchase advertising or promotional rights from a retail enterprise operating an online environment. Such promotional activities may involve presentation of coupons for selected categories of products or services. The activities may also include invitations to participate in rewards or loyalty programs.

The retail enterprise operating an online environment may also directly present advertising and promotional material. Examples of such content include invitations to secure co-branded credit cards, loyalty program information, and notices concerning sales and promotions. The promotional content may be directed to, and intended to encourage, in-store transactions, online transactions or both. The users to whom the promotions are presented may have online profiles which are mined to help target the promotional offers to users most likely to have an interest in them.

SUMMARY

In selected embodiments a repository system correlates user browsing behavior with in-store transactions involving a number of products or product categories. For example, an online portal may receive online transactional data and in-store transactional data and associate particular user identities with such data. The user identities may be correlated by matching online transactional data with in-store transactional data. This correlation identifies a user known to frequent both online and in-store venues of the same retailer. The online portal may maintain browser repository records based on an association of online and in-store identities. In some implementations, the portal identifies in-store transactions of a user known to frequent both online and in-store venues. The identification of transactions may be performed for the known user over a predetermined time period. For example, identification of such transactions may be used to project web influenced in-store transactional data from at least one browser repository record to estimate a transaction for an unknown user.

In some implementations, a method of analyzing an effect of online content on in-store transactions includes providing product-specific online content to users for consumption and determining for such users a correlation between browsing behavior and in-store activity. Such analysis optionally includes determining identification information including tracking data, associating the identification information to in-store activity, and determining user browsing behavior captured by a browse event in an online retail environment. In addition, the method optionally includes correlating user browsing behavior with in-store transactions, where the transactions pertain to a particular product or product category. The method may further include determining a relative increase in frequency or character of said transactions over a particular time period and in response to determining such an increase, the method may include selecting second product-specific online content. The new content is optionally electronically transmitted to online users.

In some implementations, the system includes an online portal interface for collaborating on web influenced in-store transactions and a customer identification module to collect transactional data from an online and/or in-store retail environment. The system optionally includes a data module to determine user purchasing behavior information by correlating online and in-store user identities. In addition, the system optionally includes a browser repository to store browser repository records generated by the customer identification module. In some implementations, the system may also include a reporting module to generate reports regarding determined in-store activities.

The details of one or more implementations are set forth in the accompanying drawing and description below. Other features, objects, and advantages will be apparent from the description and drawings, and from the claims.

DESCRIPTION OF DRAWINGS

Like reference symbols in various drawings indicate like elements.

DETAILED DESCRIPTION OF ILLUSTRATIVE IMPLEMENTATIONS

Figure 1:
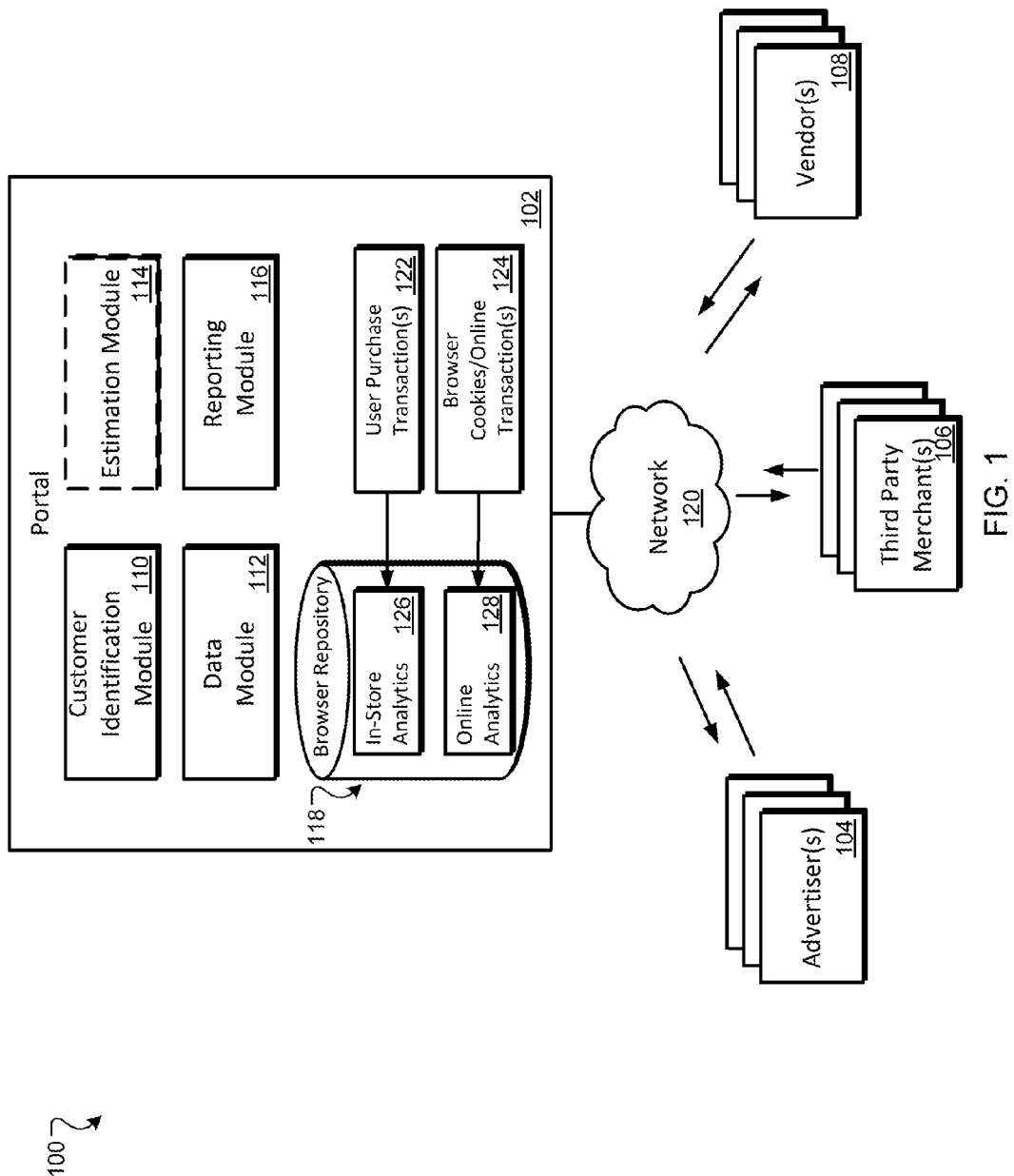
FIG. 1 illustrates an example block diagram of an environment for collaborating about web influenced in-store transactions.

FIG. 1 illustrates an example block diagram of an environment 100 for collaborating about web-influenced in-store transactions. In-store transactions generally refer to purchases, returns, and kiosk activities performed in a brick-and-mortar store. A brick-and-mortar store typically includes a number of aisles, check-out lines and physical products on display. Such stores provide cash registers and other POS devices including, but not limited to bar code scanners, RFID devices, credit terminals, kiosks, and the like. The term "web-influenced" generally describes a measurement for how an online retailer website affected an in-store transaction.

At a high level, the environment 100 receives and analyzes user browsing behavior pertaining to how a number of users browse (e.g., surf) through a webpage of a retail website. The browsing behavior is used as a metric for determining likely in-store sales for specific users. For example, if a user browses a "baby" category in the retail website, the environment 100 assumes other children's products may be of interest to the user. The environment 100 can use such browse behavior to estimate likely in-store purchases or other in-store activity.

The environment 100 includes an online portal 102 whereby a retail entity accesses data and generates reports regarding web-influenced in-store sale metrics and transactions. A web-influenced in-store sale metric generally refers to the amount of influence that an online retail environment has over an in-store purchase. Particularly, such a metric provides an understanding of how the online retail environment motivates an online user to make a trip to a physical store to transact a purchase at a point-of-sale check-out terminal.

Web-influenced in-store sales metrics apply to data across a number of different browse categories. Each browse category is analyzed to determine the effectiveness of content on a webpage or advertisement within a specific browse category. One example browse category is an electronics browse category on a retailer's website. The electronics category in this example relates to all products and services involving electronics and any advertising provided alongside such products and services on the retailer's website. Other browse categories and combinations of categories are possible. Browse categories are typically generated by each specific retailer and are configured according to each retailer's preferences.

Users of a particular retail website access the site and exhibit browsing behaviors that indicate an intention to research, purchase, and/or analyze content on the site, for example. The environment 100 analyzes the user-exhibited browsing behaviors and other online analytics. In addition, the environment 100 uses the analysis to ensure advertisers 104, third party merchants 106 and/or vendors 108 provide relevant content. The environment 100 also analyzes in-store analytics for users performing transactions in a physical store. Reports are generated to provide insight into both in-store and online sales performance according to specific users, browse categories, products, advertisements, and the like. Example reports and report content will be discussed in detail below.

As shown in FIG. 1, the portal 102 receives information from product vendors, advertisers, and merchants via a network connection, such as network 120. The portal 102 includes a customer identification module 110, a data module 112, an optional estimation module 114, and a reporting module 116, each having access to at least one browser repository 118. Modules 110-116 work in combination to analyze information received from advertisers 104, third party merchants 106, and vendors 108. The portal 102 is also configured to send analysis reports to entities 104-108 via network 120. In some implementations, the entities 104-108 send data to portal 102 via network 120.

The customer identification module 110 identifies users that shop online and/or in a physical retail store. The customer identification module 110 is capable of determining which users shop both online and in-store and can match such users to generate user profiles. The customer identification module 110 is configured to receive online transactional data from an online retail environment and to receive in-store transactional data from an in-store retail environment. In some implementations, module 110 collects or requests transactional data from third parties, advertisers, and other retailers, etc.

The customer identification module 110 uses uploaded or retrieved information to generate user profiles. For example, the customer identification module 110 generates user profiles using user purchase transactional data 122 and browser cookies/online transactional data 124. In some implementations, the customer identification module 110 accesses historical in-store analytics 126 and/or historical online analytics 128 to supplement information in the generated user profiles.

The customer identification module 110 stores generated user profiles in the browser repository 118. In some implementations, the customer identification module 110 attempts to associate parameters in uploaded data to parameters in information stored in previously created user profiles. Parameters utilized for this association include, for example, sales transaction information, address information, and promotional information.

If the customer identification module 110 successfully matches an event in the uploaded data to a user profile, the module 110 stores the new, uploaded information in association with the user's profile. If the customer identification module 108 is unable to match information in the uploaded information, the customer identification module 110 generates a new user profile in the browser repository 118.

Users can be identified by module 110 in a number of ways. For example, a user can enter a username and password, enter a loyalty card, or provide other user-specific credentials while browsing online. In some implementations, purchases from this user can be merged into one record for a specific user if the same identification is made by the user at a point-of-sale check-out terminal at some other time, if the user later purchases one or more items with the user's login credentials associated with the user's personal information, a more direct correlation is stored by the customer identification module 110.

Users exhibit browsing behaviors when surfing websites. One example browsing behavior includes accessing an online retailer through the Internet to view specific products. User browsing behaviors can be stored with particular user profiles. In general, the browsing behavior is captured as a browse event detailing a timestamp and page selected, for example. The browse event can be stored in a specific user profile if environment 100 identifies the user performing the browse event as a previously known user.

In some implementations, the data module 112 is configured to determine user purchasing behavior information by correlating online and in-store user identities. The data module can determine in-store activities (participated in by a user) that occurred within a predetermined time period relative to the user's browsing behavior. The determination can be used to estimate a portion of transactions that are web-influenced over a predetermined time period. In general, the known user represents a user that participates in online transactions at an online retail environment and participates in in-store transactions at an in-store retail environment.

In operation, the data module 112 identifies customer profiles in the browser repository 118 which contain information regarding both customer browsing activity from the browser cookies/online transactions 124 and customer in-store purchases from the user purchase transactional data 122. The data module 112 also identifies an amount of in-store purchases a particular customer made in given time periods both before and after a browse event. In particular, the data module 112 identifies in-store activity for customers who have been determined to shop both online and in-store over a predetermined time period surrounding a browse event. The time period can vary depending on the retailer's preferences. In some implementations, the data module 112 identifies in-store purchases for one to eight weeks before a browse event. In some implementations, module 112 identifies in-store purchases for two to six weeks before the browse event.

In a similar fashion, the predetermined time period after a browse event may be selected according to retailer preference. For example, the data module 112 identifies in-store purchases for about four weeks after the browse event. In some implementations, the module 112 identifies in-store purchases for a specific user for one week to five weeks after the browse event. In some implementations, the module 112 identifies in-store purchases from about one week to about three weeks after the browse event.

In one example, the data module 112 identifies in-store purchases for a particular user from about two to six weeks before a browse event to about one to two weeks after the browse event. In some implementations, the module 112 identifies in-store purchases for a particular user from about four weeks prior to about one week after an online browse event.

By comparing the customer sales made over a predetermined time period surrounding a browse event, the data module 112 estimates the number of customer in-store purchases that are web-influenced. This estimation provides an advantage of enabling a retailer to optimize particular websites and/or modify advertising schemes to increase sales.

In some implementations, the data module 112 normalizes transaction data to account for seasonality. For example, certain time periods such as pre- or post-holiday, are well known to have increased customer shopping activity and as such are not a true measure of user purchasing behavior. The data module 112 is capable of normalizing transaction data to account for these variations in customer purchasing behaviors. One example of normalizing includes determining an average weekly sale for each customer for an entire year. This average weekly sale is then used to index each week to the average in order to remove or limit variances in the customer sales data due to seasonal activity.

In some implementations, the optional estimation module 114 is configured to identify web influenced in-store transaction data of known users to predict a sales purchase for unknown users. The web influenced in-store transaction data from the known user is extracted from browser repository records. For example, web-influenced transaction data is calculated for those customer profiles which contain both browsing data from the browser cookies 124 and in-store purchase data from the user purchase transactions 122. The estimation module 114 optionally categorizes customer profiles for which web-influenced transaction data is available. For example, the estimation module 114 categorizes customer profiles according to a level of sales such as high sales, low sales, and/or medium sales. The estimation module 114 then determines a percentage of customer profiles that are assigned to each level of a sales category, and the average amount of transactions that are web-influenced for those customers in each sales category, for example. The estimation module 114 also analyzes data to determine sales that may have been attributable to a user's online browsing session.

The estimation module 114 optionally projects a number of web-influenced in-store transactions for customers with no available web-influenced data (e.g., unknown users) by assuming that these customers have similar behaviors to those of known users. Thus, in some implementations, the estimation module 114 assumes unknown users make a similar average amount of web-influenced transactions as known users. In some implementations, the data module 112 identifies in-store transactions for users during a predetermined period of time. The estimation module 114 then extrapolates online influenced in-store transaction data of at least one known user from the identified in-store transactional sales to estimate online influenced store activities for an unknown user.

In another example, the estimation module 114 optionally assumes that the sales level distribution of future sales by unknown users will be the same as what occurs during average, in-store sales, instead of the distribution for customers for which there is web-influenced transaction data available. In this example, the estimation module assumes that the average amount of sales that are made in each sales category will be the same as what will occur in future sales by unknown users. Using average in-store transaction data and the average amount of sales as determined by the data module 112, the estimation module 114 estimates in-store transactions and/or activities for an unknown user based on browser repository records and in-store transaction data.

However, it has been determined that customers for whom web-influenced transaction data is available are generally better customers than average. Therefore, the estimation module 114 optionally adjusts the web-influenced transaction data to account for the fact that the data that is available is generated for customers which are better than average. The estimation module 114 optionally assumes that the percentage of customers for which no web-influenced in-store transaction data is available in each level of a sales category is the same as the average level of sales percentages, instead of the percentages determined using the web-influenced in-store customer profiles categories. The estimation module 114 optionally uses the same average amount of sales as is generated by the web-influenced in-store transaction data. The estimation module 114 optionally uses an adjusted percentage and the same amount of sales data to determine the web-influenced in-store transaction data for those customers for which web-influenced in-store data cannot be actually measured.

The reporting module 114 is configured to generate reports regarding web-influenced in-store purchases. The reporting module 114 generates reports for total web-influenced in-store transactions, as well as for particular product lines and/or divisions or departments. Reports are distributed to both internal and external entities. For example, reports are generated and distributed to advertisers 104, third party merchants 106, and/or vendors 108. In some implementations, reports are distributed internally for a particular online retailer, for example.

In some implementations, the reporting module 114 uses data generated by the data module 112 or the estimation module 114 to generate customer purchase behavior reports. In some implementations, the purchase behavior reports show information relating to sales from physical stores (i.e., in-store point-of-sale terminals), websites, and/or kiosk locations.

The browser repository 118 maintains on a server raw and analyzed information regarding user purchasing transactions 122 and user browser cookies/online transactions 124. Raw and analyzed information is uploaded to the browser repository 118. Browser repository information includes raw data, such as information regarding particular sales or customer website browse events, or analyzed information that is generated from the raw data. The browser repository 118 also includes customer profiles, created by the customer identification module 110, each profile containing information regarding particular customers in association with that particular customer's purchasing or browsing behavior.

In some implementations, the browser repository 118 tracks cookie data from online user sessions. Since online user activities and access information can be tracked in the form of cookies, information can be provided about the buying habits, intentions, and needs of a large numbers of users. Access to such information is used to target groups of users and project and/or estimate future purchases.

In some implementations, the modules 110-116 include one or more software processes executing on one or more computing devices, such as servers that can be located in disparate locations. In some implementations, the modules 110-116 are executed on a single machine running in the same location as a customer kiosk or point-of-sale terminal.

In some implementations, the portal 102 is accessed by advertisers 104 for generating reports regarding web-influenced in-store transactions relating to advertising events. The portal 102 is also accessed by vendors 108, both online and in-store, for generating reports regarding web-influenced in-store transactions of products in which parties have an interest. The portal 102 is additionally accessed by third party merchants 106 for generating reports regarding web-influenced in-store transactions of products in which they have an interest.

Figure 2:
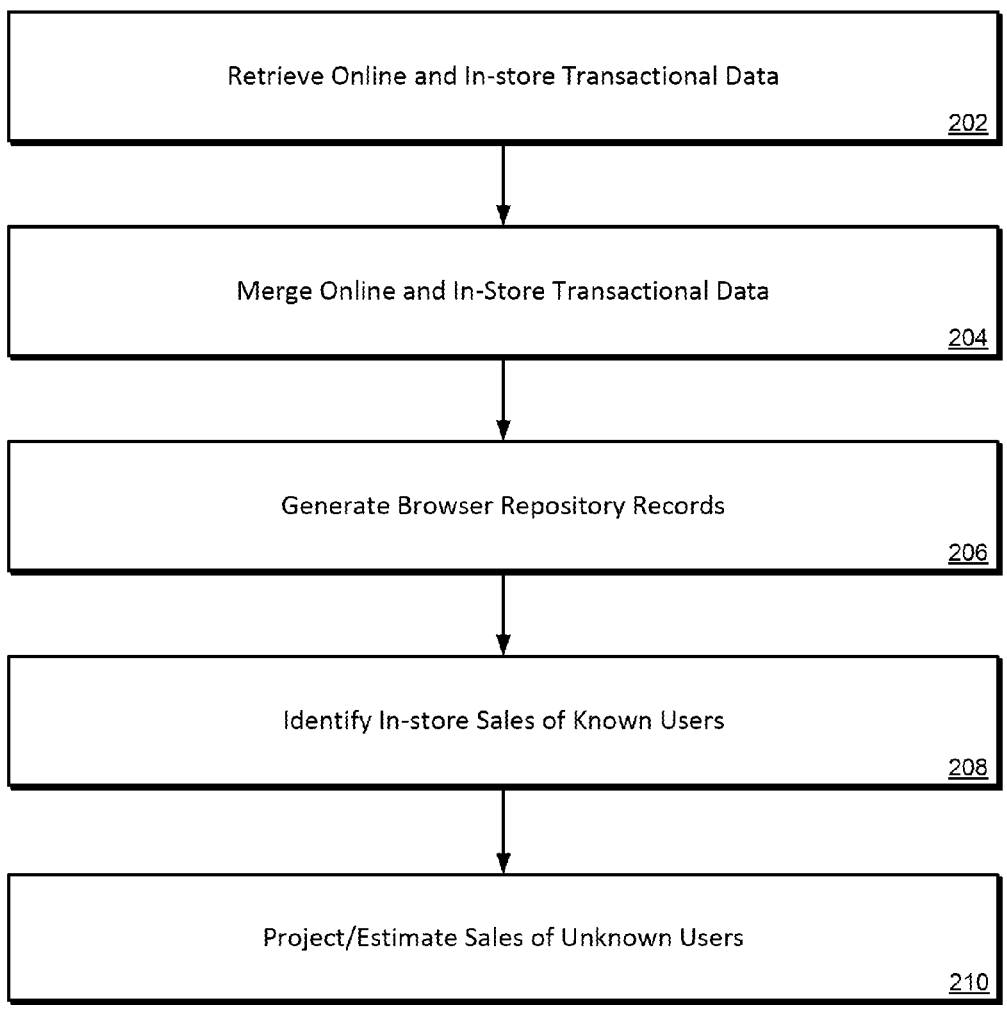
FIG. 2 illustrates a flow chart of an example process for estimating transactions for unknown users.

FIG. 2 illustrates a flow chart of an example process 200 for estimating transactions for unknown users. Although the environment 100 (FIG. 1) and parts thereof will be referred to in the following examples, other environments or systems in combination with or instead of the environment 100 can be used.

Referring to FIG. 2, customer identification module 110 retrieves (202) online and in-store transactional data. For example, a user creates a login account on a webpage associated with an online store. During the creation of the login account, the user inputs names, logins, secure payment data, etc. If the webpage offers products or services for purchase, account creation generally includes contact information, and/or shipping information provided by the user when making online purchases. The browsing behavior enables the webpage to identify the user via a cookie created when the user accesses the webpage.

The data module 112 is configured to determine how user purchasing behavior information is related to online user browsing behavior. The data module 112 determines in-store transaction events that occurred within a predetermined time period relative to the same user's browsing behavior through an online retailer based on one or more products. For some of the associations between the online and in-store information, the portal 102 attempts to develop a mathematical relationship between the online browsing information and the in-store purchasing information. Accordingly, if the user searches for an item for sale online, and purchases the item in-store, a correlation can be developed between the browsing information and the purchasing information, for example.

The data module 112 merges (204) particular online and in-store transactional data. In one example, the data module 112 merges online and in-store transactional data which pertains to the same user into a single record. For example, the data module 112 matches an online user to an in-store user using the transactional data. The matched online and in-store transactional data can be stored in a browser repository record. In operation, the data module 112 attempts to match the information of an online user to information stored for an in-store user. For example, if the online user accesses a user account during the online store browsing and uses a reward card, a loyalty card, or other user identifying data during the in-store purchase, the data module 112 matches the online user and the in-store user if the addresses associated with the user account and reward or loyalty card are identical. Other methods for matching in-store users to online users are possible.

Upon retrieving online user data and in-store user data, the customer identification module 110 generates (206) browser repository records based on the matched online and in-store user data. The browser repository records include information collected from the online and in-store user data, as well as any correlation developed between the browsing and user purchasing data.

The data module 112 identifies (208) in-store transactions for known users who shop both in-store and online. For some of the positive matches between the online and in-store information, the data module 112 attempts to develop a mathematical relationship between the online browsing information and the in-store purchasing information. Accordingly, if the user searches for an item for sale online, and purchases the item in-store, a correlation can be developed between the browsing behavior and the purchasing information, for example.

In some implementations, the established correlation allows the estimation module 114 to estimate (210) sales and/or in-store activities for unknown users. For example, if there is an increased likelihood for a matched user to purchase an item in-store if a specific user browsed the item online, then the store may promote items in the sales category online to influence the in-store purchasing behaviors of unmatched users browsing the online store.

Figure 3:
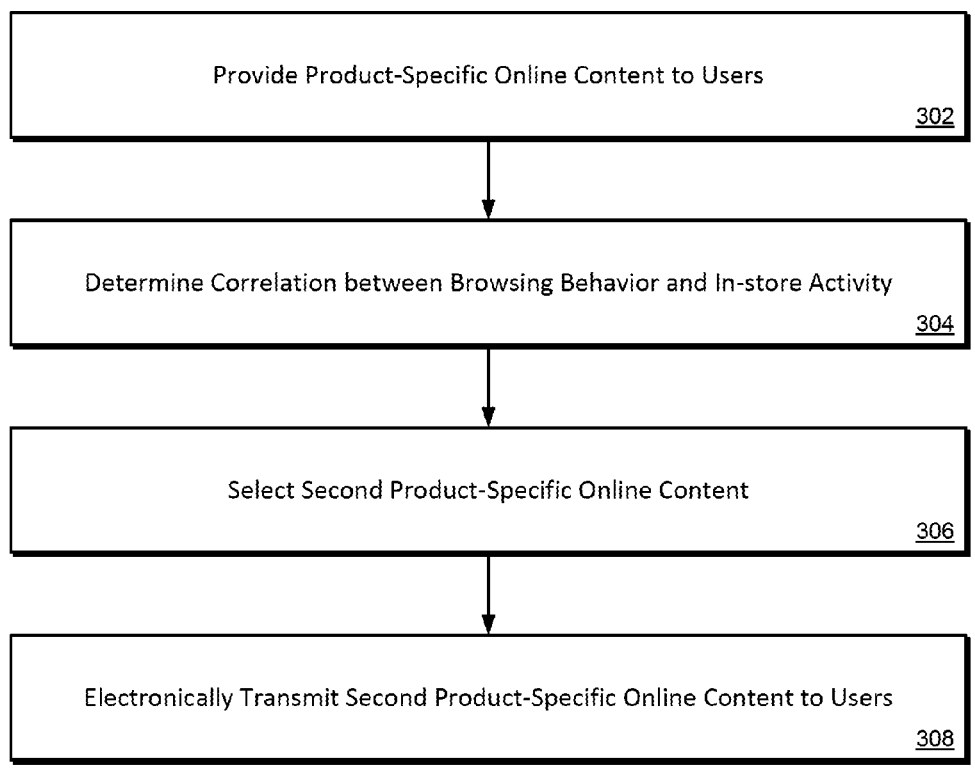
FIG. 3 illustrates a flow chart of an example process for analyzing an effect of product-specific online content on in-store transactions

FIG. 3 illustrates a flow chart of an example process 300 for analyzing an effect of product-specific online content on in-store transactions. The process 300 includes providing (302) first product-specific online content to online users at a first time. For example, advertisers 104 may provide advertisements to a retail website. The process 300 can determine for users a correlation between (a) browsing behaviors related to the advertisements and (b) in-store activity.

Determining a correlation between browsing behavior and in-store activity includes, for example, determining, for a first user, identification information including tracking data. The tracking data may pertain to cookie data, address data, purchase data, or other trackable data pertinent to a user's online behavior. The portal 102 can, for example, associate the identification information to in-store activity over a predetermined time period. In one example, the predetermined time period is four weeks before an online browse event up until one week after the online browse event.

The portal 102 determines browsing behavior captured by a browse event in an online retail environment for the predetermined period of time starting at a system selected time. The system selected time refers to a time after which product-specific online content is provided to a user. The browsing behavior in this example is generally associated with a number of products or product categories. The portal 102 associates browsing behavior with in-store transactions involving the aforementioned products and/or product categories.

Using the transaction data and the user browsing behavior, the portal 102 determines a relative increase in frequency or character of the transactions after the system selected time. If the portal 102 determines a relative increase in frequency or character of the transactions after the system selected time, the portal 102 selects (306) another product-specific online content and electronically transmits and/or serves (308) the new online content to the online users. In some implementations, the new online content is substantively similar to the first provided product-specific online content, but has a different configuration relative the first provided online content.

In some implementations, the process 300 includes extrapolating web influenced in-store transaction data of a known user from identified in-store transactional sales to estimate web influenced in-store transactions for an unknown user. For example, the portal 102 calculates sales for known users taking into consideration user browsing behavior and purchasing behavior. The portal 102 then extrapolates from the sales and behavioral data how unknown users' in-store sales would be influenced by the online browsing. In some implementations, identifying in-store transactions users includes "de-seasonalizing" previous sales data and calculating a ratio of browsed content to purchased product. For example, if a holiday event occurs around a particular browsing event, the portal 102 "de-seasonalizes" the sales based on the likelihood that more shopping was naturally performed around the holiday. Thus, transaction data can be adjusted based on seasonality, as described above.

In the event that portal 102 determines that particular online content browsed by known users was ineffective or less effective than estimated, the portal 102 can modify online strategies for placing such online content. Namely, the retailer can change a particular web layout including advertisements, coupons, email contacts, splash pages, Find It At a Target Store (FIATS) content, or other metrics to increase the influence the online content has over incremental in-store sales. In one example, a retailer modifies an online strategy for placing online content by changing a configuration of the current online content, such as advertisements.

Figure 4:
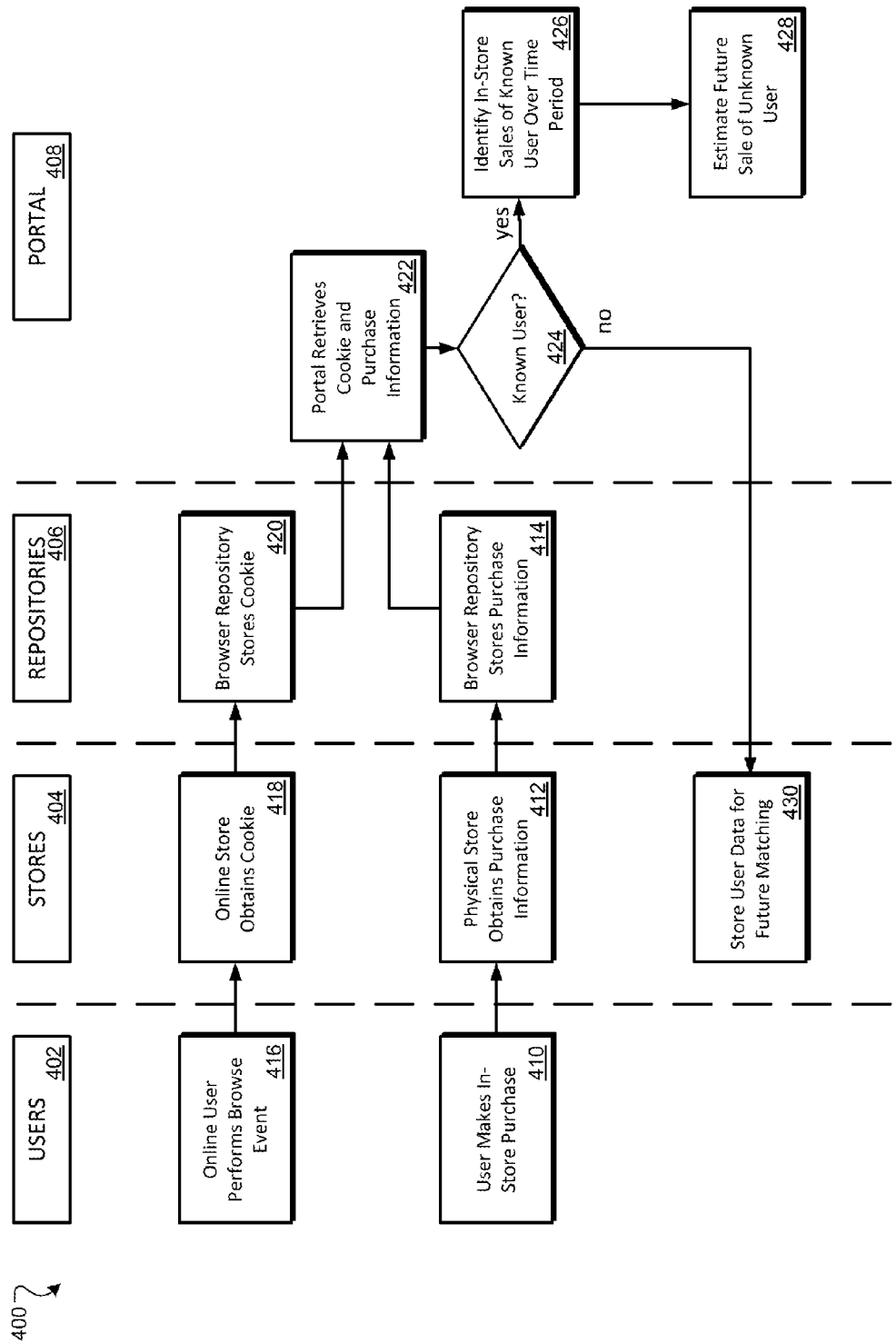
FIG. 4 illustrates a swim lane diagram of an example procedure for estimating web-influenced in-store transactions.

FIG. 4 illustrates a swim lane diagram of an example procedure 400 for estimating web influenced in-store transactions. The procedure 400 is used in an environment, such as environment 100, to estimate future sales based on current sales and to modify an online strategy to increase sales. Users 402 represent online and in-store browsers and/or purchasers. Each user may be represented by both an online identity and an in-store identity. Stores 404 represent both online store and physical store locations of a single retailer. In some implementations, procedure 400 is used for a number of separate and distinct retailers. Repositories 406 are used to store information pertaining to users 402, stores 404, and a portal 408.

In operation of procedure 400, users 402 make in-store purchases (410). Each time a user makes a purchase at a physical store, the physical store obtains (412) purchase information pertaining to products, user identity, location, payment information, etc. The repositories 416 store (414) some of the information acquired during the purchasing transactions.

At some point users browse the online retail store. The browsing causes browse events related to particular users. Upon initiation of a browsing session, a cookie is sent to the accessed online retail store. Certain activity within the browsing session makes a call to a server and the server tracks the activity with relevant browse session data for the cookie. For example, a user may search for a product, such as an alarm clock and place one of several viewed clocks into a virtual shopping basket. Placing the alarm clock in the virtual shopping basket uses the generated cookie to track the shopping activity. The cookie information can be collected and maintained in the browser repository if the system recognizes the browsing user, for example.

Storing such cookie information provides additional information to be stored with this user's profile. Information from browsing sessions, such as cookie identifiers can be used to further identify a specific user or category of user. Thus, online stores 404 typically obtain (418) cookie information 418 and repositories 406 store (420) the obtained cookie information. In one example, the portal 408 uses the collected information to identify users who shop both online and in-store for a particular retailer. If an online and in-store user is matched, the repositories 406 store the association in browser repository records alongside each user's identity data. If a match is available, the matched user is flagged as a known user. Known users provide retailers data to estimate how one or more unknown users will browse and purchase in the future.

In a similar fashion, cookie information can be tied to particular user's in-store shopping habits if, for example, the same user purchases content both online and in-store with the same loyalty card or other magnetically stored identification card. In this example, the user above may have searched for an alarm clock online and placed a desired alarm clock in the user's virtual basket. The same user could decide to instead make such a purchase in-store and as such, may exit an online transaction and make the purchase later that week in a local store. If the user were browsing with a user account (i.e., logged into a known user account), the user could make the in-store purchase using the loyalty card or other user identifying means which may have been previously used on the user's online account. Here, a merchant can associate the user's browsing behavior with the user's in-store activity using the loyalty card information or other user-identifying means stored in the user's online account and employed at the in-store location.

The portal 408 retrieves (422) cookie information associated with the online browsing session and purchase information. The portal 408 determines whether the retrieved cookie and purchase information provides a match for a known user. If the portal 408 recognizes (424) a known user, the portal 408 identifies (426) in-store sales for the known user. In some implementations, the portal 408 identifies all in-store activities. The identifying includes monitoring sales over a specific time period. In some implementations, the identification of in-store activities includes performing a lookup for previous activities carried out by the known user.

The portal 408 analyzes in-store transactions to estimate (428) sales and/or activities for an unknown user. For example, the portal 408 analyzes particular browsing behavior of the known user before and/or after, the user makes a physical purchase. In some implementations, the portal 408 establishes a correlation between the known user's browsing behavior and purchasing behavior. If the user is determined by portal 408 to be an unknown user, the user data is stored (430) in stores 404 for future matching or use.

In some implementations, the portal 408 utilizes the established correlation between the browsing behavior and the purchasing behavior of matched users to project and/or modify online advertising strategies. For example, if a correlation exists between a specific online advertisement of a product and an increase in sales for the product among matched users, the website can present the specific online advertisement to all users to influence the in-store sales of the product.

In some implementations, the portal 408 utilizes an established correlation between browsing behavior and purchasing behavior of matched users to generate new associations for the users. For example, the portal 408 can determine a user often searches and/or purchases the same product types. Using this information, the portal 408 can analyze how best to market such a product type to the user. For example, the portal 408 can provide a coupon for baby diapers if a correlation is made between how often the user purchases baby diapers in-store. Such a correlation allows the merchant to provide incentive for the user to shop in-store instead of online for baby diapers, for example.

In certain implementations, the portal provides the established correlation between the browsing behavior and the purchasing behavior of matched users to online vendors to enhance the collaboration between the online vendors and the store. In some implementations, the established correlations, such as the example described above, can assist the sales of the products of the online vendors.

Figure 5:
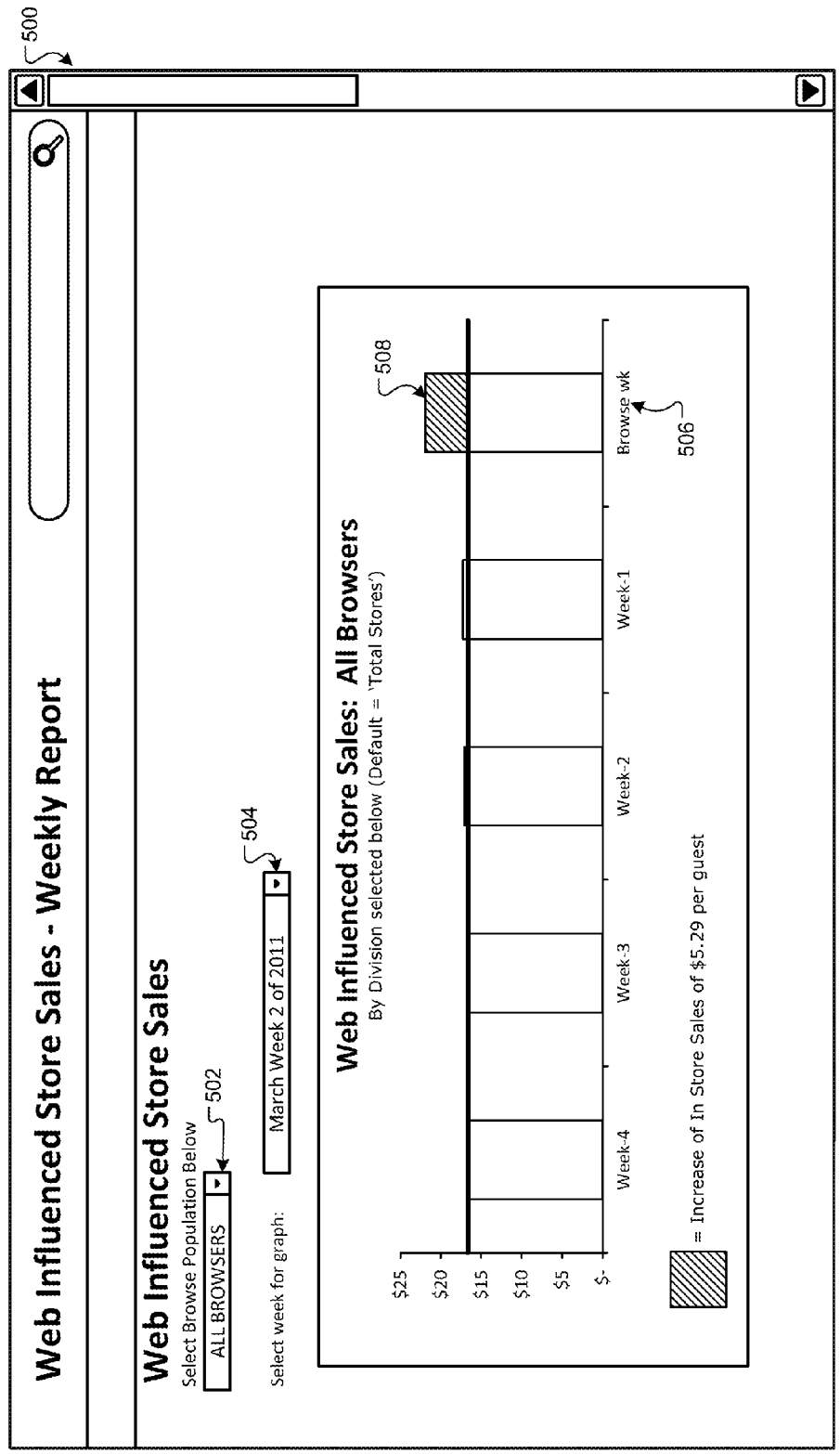
FIG. 5 illustrates a snapshot of an example browser report.

FIG. 5 illustrates a snapshot of an example browser report 500. The browser report 500 illustrates web influenced transaction data for a number of users over several categories. Each report may be static or interactive. In some implementations, the reports are provided online via portal 102, for example. The report depicted in FIG. 5 is merely an example and other metrics, controls, and data can be employed.

Referring to FIG. 5, a user has selected "All Browsers" from the dropdown box 502 indicating that a generated report will include web influenced transaction data for an entire population of browsers for a particular category. In some implementations, the user selects multiple categories or all categories using a selection control (not shown). In addition to the browser population, the user selected a specific week of the year for display. In the depicted example, the user selected "March Week 2 of 2011."

Report 500 graphically illustrates web influenced store sales for all browsers across all stores. Each bar graph depicts a level of sales for one week. Five weeks are shown with "Week-4" representing four weeks prior to a browse event, "Week-3" representing three weeks prior to a browse event, and so on. The browse event discussed above occurs after four weeks of data and is shown as "Browse wk," representing a browse event date 506.

Report 500 shows that during week two of March, 2011, there were a number of visitors to "All Browsers" on the retailer's website. The portal 102 determines a percentage of the browsers that represent known users by accessing the browser repository 118, for example. The known users spent an average of $17.85 in the four weeks prior to the known user's browse event date 506. In the week immediately after the user's browse event date 506, the known users spent an average of $23.14. The increase in sales based on the browse event is shown by block 508. Block 508 depicts an increase of in store sales of $5.29 per user.

Figure 6:
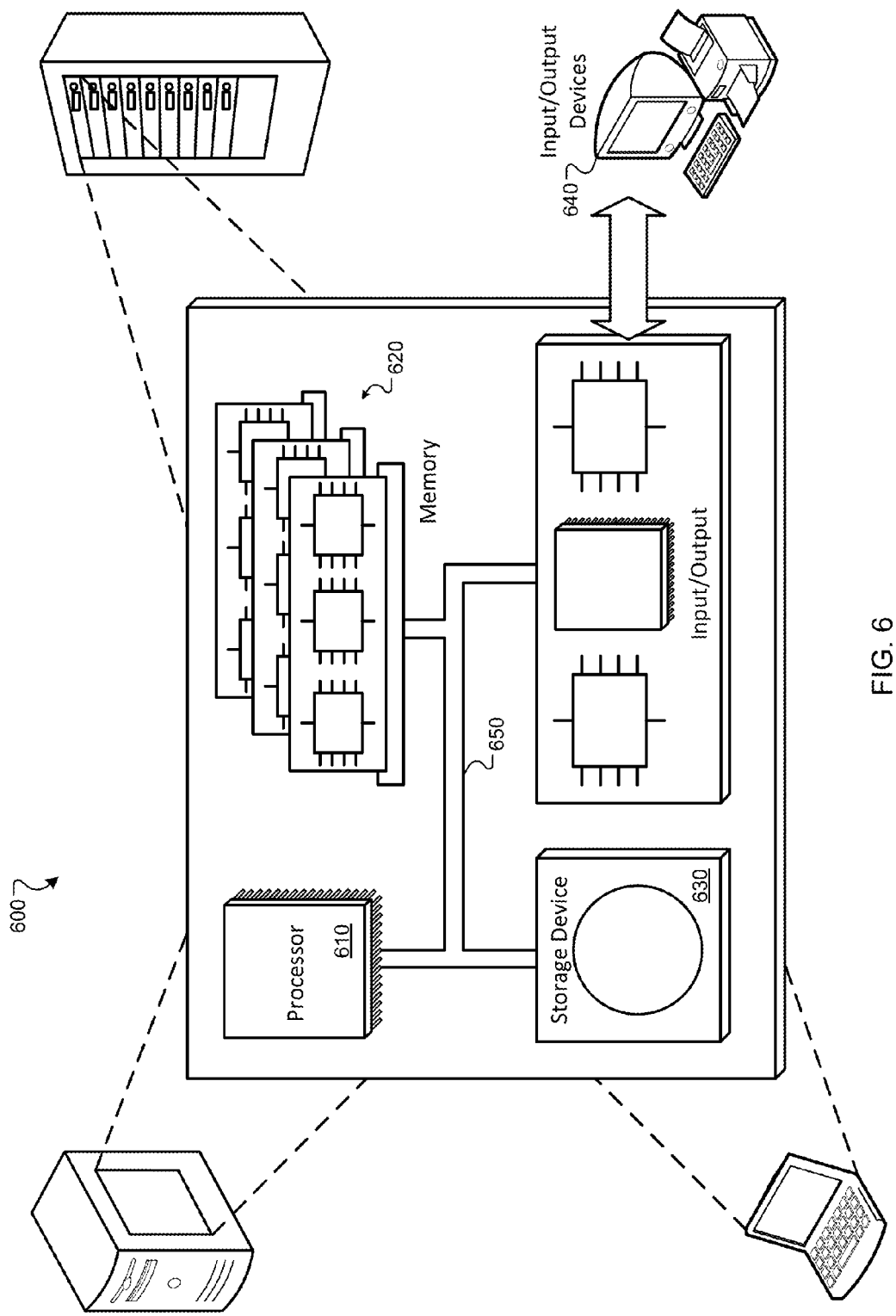
FIG. 6 is a block diagram of a computing system optionally used in connection with computer-implemented methods described in this document.

FIG. 6 is a schematic diagram of a generic computer system 600. The system 600 is optionally used for the operations described in association with any of the computer-implemented methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 is optionally a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A computer-implemented method comprising:
receiving in-store transactional data from an in-store retail environment for known users, the in-store transactional data comprising data related to purchases of products by the known users;
maintaining on a server browser repository records, wherein each browser repository record stores browser behavior metrics for a known user in an online retail environment, the browser behavior metrics comprising browsing products online;
correlating purchases of products in-store with browsing of products online to identify web-influenced in-store transactions for known users;
categorizing each known user into one of a set of sales levels based on the value of the products purchased by the known user to produce percentages of known users in each sales level;
for each sales level, determining by a processor an average number of web-influenced in-store transactions for the known users categorized in that sales level;
for each sales level, determining by a processor a percentage of all users that are within the sales level, where the percentage is different from the percentage of known users that are within the sales level; and
estimating by a processor a number of web-influenced in-store transactions for unknown users by weighting the average number of web-influenced in-store transactions for the known users at each sales level by the percentage of all users within each sales level.

2. The computer-implemented method of claim 1 further comprising identifying in-store transactions of a known user for a predetermined time period after an online browse event performed by the known user.

3. The computer-implemented method of claim 1 further comprising maintaining cookie identifier data for multiple users of the online retail environment in the at least one browser repository record.

4. A system comprising a server configured with:
a customer identification module to collect online transactional data from an online retail environment and associate online transactions with online user identities and to collect in-store transactional data from an in-store retail environment and associate in-store transactions with in-store user identities;
a data module to determine known users purchasing behavior information by correlating online user identities with in-store user identities, the correlating comprising, for each of a plurality of known users, determining that in-store transaction events involving the known user and one or more products that occurred within a predetermined time period relative to the known user's browsing behavior associated with the one or more products are web-influenced in-store transaction events;
a browser repository to store browser repository records generated by the customer identification module; and
an estimation module executed by a processor to predict a number of web-influenced in-store transactions for unknown users from the known users purchasing behavior information, the estimation module determining an average number of web-influenced in-store transaction events involving known users in each of a set of sales levels and using percentages of all users in each of a set of sales levels to weight the average number of web-influenced in-store transaction events in each sales level where the percentages of all users are different from percentages of known users in each sales level as provided by the known users purchasing behavior information.

5. The system of claim 4 wherein the system further comprises a reporting module to generate reports regarding the determined in-store transaction events.

6. The system of claim 5 wherein the reporting module outputs an interactive report to a vendor.

7. The system of claim 5 wherein the reporting module outputs a report detailing known user browsing behavior data for one product category of a retail website.

8. The system of claim 5 wherein the reporting module outputs a report detailing known user browsing behavior data for each product category of a retail website.

9. The system of claim 4, wherein the system further comprises an online portal interface that is accessible to product vendors via a network connection.

10. The system of claim 4 wherein the data module determines a portion of said determined in-store transaction events associated with the known user's browsing behavior.

11. A computer-implemented method comprising:
grouping known users into sales levels based on the value of the products they purchased;
determining by a processor an average number of in-store sales in each sales level that are web-influenced, where an in-store sale is web-influenced if it comprises a known user purchasing a product that the known user previously viewed online;
for each sales level, the processor determining a percentage of all users that are in the sales level, where the percentage of all users in the sales level is different from a percentage of known users in the sales level; and
estimating by the processor a number of web-influenced in-store sales for unknown users by weighting the average number of web-influenced in-store sales in each sales level by the percentage of all users that are in each sales level.

12. The computer-implemented method of claim 11 wherein estimating a number of web-influenced sales for unknown users comprises determining average weekly sales for a known user for a year and normalizing a number of web-influenced sales for the known user based on the average weekly sales.

13. The computer-implemented method of claim 11 wherein a sale is a web-influenced sale if it further comprises a known user purchasing a product about one to two weeks after the known user viewed the product online.

14. The computer-implemented method of claim 11 wherein estimating a number of web-influenced sales for unknown users further comprises adjusting a number of web-influenced sales based on seasonality.

* * * * *